United States Patent [19]
Donovan

[11] Patent Number: 6,142,186
[45] Date of Patent: Nov. 7, 2000

[54] THREAD-FORMING PIPE PLUG

[75] Inventor: Steven P. Donovan, Roscoe, Ill.

[73] Assignee: Textron Inc., Providence, R.I.

[21] Appl. No.: 08/784,049

[22] Filed: Jan. 17, 1997

[51] Int. Cl.[7] .................................................. F16L 55/10
[52] U.S. Cl. .......................... 138/89; 138/96 T; 220/289
[58] Field of Search .................................. 138/89, 96 R, 138/96 T; 215/356, 357, 364; 220/288, 289

[56] References Cited

U.S. PATENT DOCUMENTS

| | | | |
|---|---|---|---|
| Re. 17,528 | 12/1929 | Mersfelder et al. | 220/287 |
| Re. 17,667 | 5/1930 | Mersfelder et al. | 220/289 |
| Re. 18,100 | 6/1931 | Mersfelder et al. | 220/289 |
| 52,269 | 1/1866 | Connelly | 215/356 |
| 130,208 | 8/1872 | Frank | 215/356 |
| 190,224 | 5/1877 | Kromer | 217/107 |
| 597,000 | 1/1898 | Higbee | 285/333 |
| 658,313 | 9/1900 | Bernardi | 403/300 |
| 936,444 | 10/1909 | Gillon | 220/288 |
| 1,306,641 | 6/1919 | Steenstrup | 220/582 |
| 1,702,878 | 2/1929 | Mersfelder et al. | 220/287 |
| 2,009,679 | 7/1935 | Placide | 285/251 |
| 2,021,704 | 11/1935 | Thatcher et al. | 411/423 |
| 2,024,069 | 12/1935 | Sharp | 411/425 |
| 2,269,476 | 1/1942 | Poupitch | 411/312 |
| 2,352,540 | 6/1944 | Hanneman | 411/308 |
| 2,484,644 | 10/1949 | Poupitch | 411/311 |
| 3,089,603 | 5/1963 | Leslie-Smith | 215/356 X |
| 3,203,460 | 8/1965 | Kuhne | 411/263 |
| 3,351,115 | 11/1967 | Boehlow | 411/168 |
| 3,481,380 | 12/1969 | Breed | 411/309 |
| 3,527,136 | 9/1970 | Wilson | 411/423 |
| 3,633,455 | 1/1972 | Larson | 411/423 |
| 3,878,759 | 4/1975 | Carlson | 411/416 |
| 3,978,760 | 9/1976 | Muenchinger | 411/386 |
| 4,091,841 | 5/1978 | Beneker et al. | 138/89 |
| 4,331,414 | 5/1982 | Wheatley, Jr. | 411/311 |
| 4,430,036 | 2/1984 | Chapman | 411/416 |
| 4,487,228 | 12/1984 | Waldo et al. | 138/96 T |
| 4,503,934 | 3/1985 | Stephanus et al. | 138/89 X |
| 4,797,022 | 1/1989 | Crigger | 403/408.1 |
| 5,088,869 | 2/1992 | Greenslade | 411/386 |
| 5,289,851 | 3/1994 | Jorgensen | 138/89 |
| 5,680,954 | 10/1997 | Arnold et al. | 215/356 X |

*Primary Examiner*—Patrick Brinson
*Attorney, Agent, or Firm*—Trexler, Bushnell, Giangiorgi & Blackstone, Ltd.

[57] ABSTRACT

Disclosed is a plug and fastener for sealing in an opening formed in a workpiece, and the plug and fastener includes a shank having a threaded portion for engaging with an internal wall of the opening and providing a first seal, and having a sealing portion extending from the threaded portion. The sealing portion initially enters the opening and is configured to engage and provide a second seal against the internal wall of the opening.

22 Claims, 5 Drawing Sheets

THREAD-FORMING PIPE PLUG

BACKGROUND

The present invention relates to self-tapping fasteners, and more particularly to removable, self-tapping threaded pipe plugs that will provide a sealed end plug with respect to fluids and liquids carried in the pipe, the pressure tight end plug being attained preferably without thread sealing compounds. The present invention also relates to a novel sealing end portion for use on a pipe plug.

National standards for pipe plug threads have been developed and are widely used, these are well known in the art and are referred to as National Pipe Thread standards—Fuel and oil, viz., —NPTF standards. The standard tapered NPTF pipe plug has been developed for use in engagement with a pre-tapped pipe or workpiece. The pipe is prepared by first drilling a straight hole, which is then taper reamed to provide a tapered hole. Finally the tapered reamed hole is tapped with a NPTF tapered tap to provide an internally threaded, tapered aperture, the internal thread being formed to a prescribed, predetermined configuration. With the standard NPTF pipe plug, the roots of both the exterior and interior threads are truncated slightly more than the crests so that the roots have wider flats than the crests, which is designed to produce metal-to-metal contact and deformation occurring at the crests and roots coincident with threaded engagement, prior to attaining thread flank contact. The deformation of the crests of the internal and external threads provides a sealing action at both the major and minor diameters, in theory preventing spiral leakage through the threads. In practice, however, due to the capillary action of the fluid or gas carried in the pipe, a potential spiral leakage path exists along the helix of the screw thread, if deformation does not completely seal the spiral path.

One disadvantage of the standard NPTF pipe plug is that during installation of the NPTF plug into the pre-tapped hole cross-threading may occur, which results in an unsealed spiral path along the threads. The cross-threads may not be detected and thereby causes fluid leakage under pressure at the plug seal during service. When, the cross-threading is detected, the joint often must be scraped or reworked, both of which are costly and time consuming.

Accordingly, objects of the present invention are to provide a pipe plug which can cold-form threads into an untapped internally tapered pipe wall and which assures fluid sealing of the pipe without use of thread sealing compounds, even after repeated removal and installations, as well as allowing replacement in the pipe with a subsequently employed standard NPTF pipe plug, if necessary. Also, the present invention allows a sealed pipe plug to be formed with a less costly fabrication and assembly procedure, as the tapping of the tapered pipe aperture prior to engagement of the plug is eliminated. Also, since the pipe plug of the present invention engages an untapped internal wall and serves to form the female NPTF threads as it is assembled, there is no danger of cross-threading. Further, as will be discussed more filly hereinafter, the sealing point or end portion on the plug of the present invention attains a positive seal, and pre-stresses the pipe wall structure to provide higher resistance to internal pressures and leakage. This seal augments that attained with the inter-engaged NPTF thread to assure a leak proof joint. Further, while it is anticipated that the novel plug of the present invention will be used with an internally tapered opening in a workpiece, it is envisioned that the plug could be employed with a non-tapered opening.

BRIEF SUMMARY OF THE INVENTION

In accordance with the present invention, there is provided a method of fabrication of a joint and a self-thread-forming plug for sealing and forming threads in a tapered aperture formed in a workpiece, such as a pipe. The plug includes a shank having a driving portion, which may be in the form of a driving head in the illustrated embodiment; a section of threads formed to the NPTF external thread standard proximate said driving portion, including a tapered thread-forming sections designed to form a standard NPTF internal thread, a second threaded portion between said thread-forming section and said drawing portion, also formed to a predetermined NPTF standard and designed to engage the internal threads form by said first section to provide a standard NPTF type, metal-to-metal deformed seal. Further, the plug may also employ a forward sealing portion which is sized to engage the tapered aperture and provide a further seal. More specifically, the forward sealing portion has a configuration designed to engage and seal against the wall of the tapered workpiece aperture in order to provide a seal, which could be used to supplement the sealing attained by the threaded engagement of the second thread portion against the female threads formed in the tapered workpiece hole. As such, the forward sealing construction may be used and the thread-forming plug of the present invention, or on a standard NPTF plug.

In a preferred embodiment of the plug, the unthreaded sealing portion on the plug has a maximum diameter smaller than the smallest minor diameter of the tapered female thread formed by the tapered thread-forming portion, in order to insure that the sealing portion can be withdrawn through the smallest minor diameter of the formed female thread in the workpiece hole without deformation of the female thread. As such, after removal of the plug, the formed female threads in the tapered aperture remain intact to allow re-threading therein of the plug or a replacement NPTF plug of the same thread configuration, such as a conventional, standardized NPTF pipe plug.

Particular configurations of the sealing forward portions for a pipe plug includes a sealing end portion which have one or more annular sealing rings which engage and bite into or deform the tapered aperture wall of the workpiece hole, preferably as the cold-forming of the female thread portion in the hole by the thread-forming portion of the plug nears completion. The sealing portion in the form of a ring or rings, or merely a bulbous or straight or tapered end portion engage and deform the workpiece aperture wall to produce annular sealing deformation which engages and seals against the structure of the plug sealing portion to pre-stress the workpiece and insure a pressure tight fluid seal, which eliminates any possibility of a spiral leak path between the formed thread turns of the workpiece hole and the thread-forming turns of the plug. Again, these sealing portion configurations may be used with the thread-forming plug of the present invention or standard NPTF plugs, to provide enhanced sealing.

BRIEF DESCRIPTION OF THE DRAWINGS

FIGS. 4–10 are side views of six further embodiments of thread-forming pipe plugs with six different configurations of the respective sealing tip portions thereof; and FIGS. 4a–10a are enlarged fragmentary views of the sealing formations produced in pipe apertures by the respective embodiments of the corresponding plugs shown in FIGS. 4–10, also showing the anticipated pre-stressing patterns.

DETAILED DESCRIPTION OF THE ILLUSTRATED EMBODIMENTS

Figure 1:
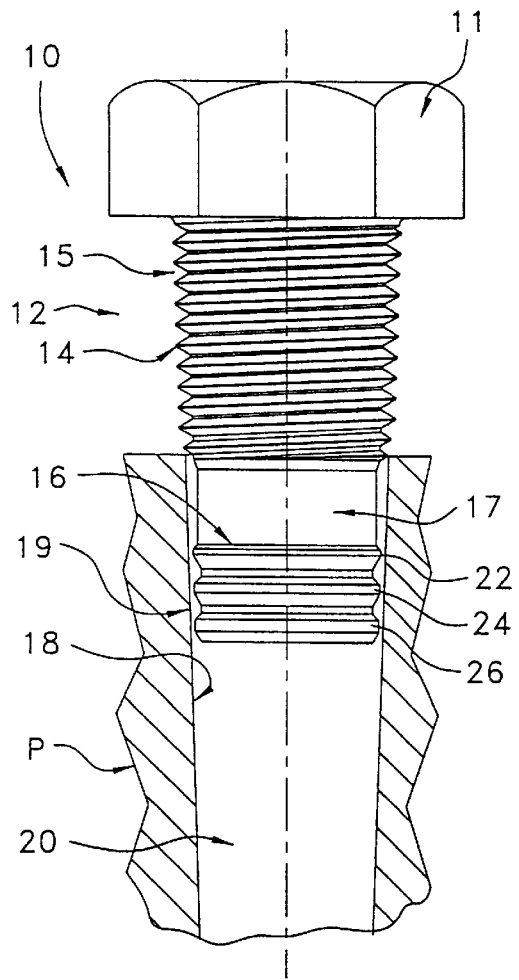
FIG. 1 is a side view in section of one embodiment of a self-tapping pipe plug with sealing end portion thereof in accordance with a preferred form of the present invention, shown initially entering a tapered pipe or workpiece aperture.
Figure 2:
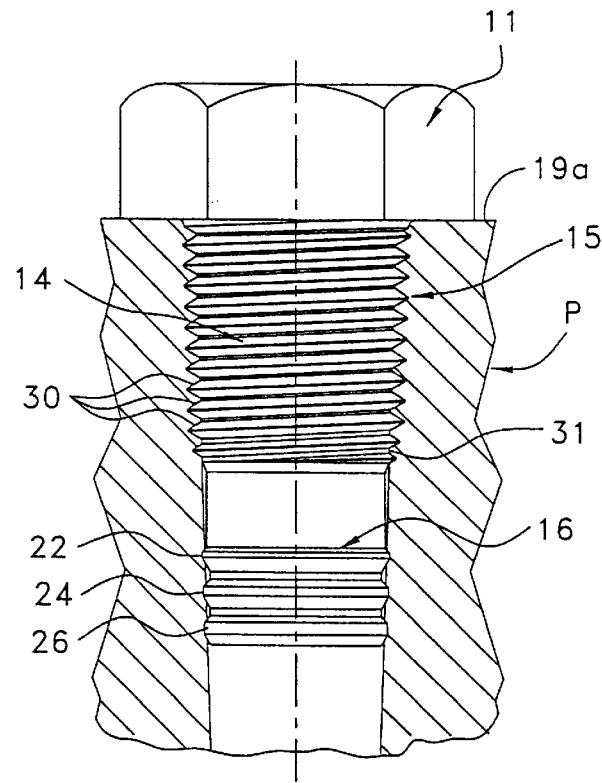
FIG. 2 is a side view, again in section, similar to FIG. 1 showing completed engagement of the self-tapping plug and the seal attained by the sealing portion of the plug, as well as completion of cold-formed threading by the thread-forming portion of the plug fully inserted into the workpiece aperture.
Figure 3:
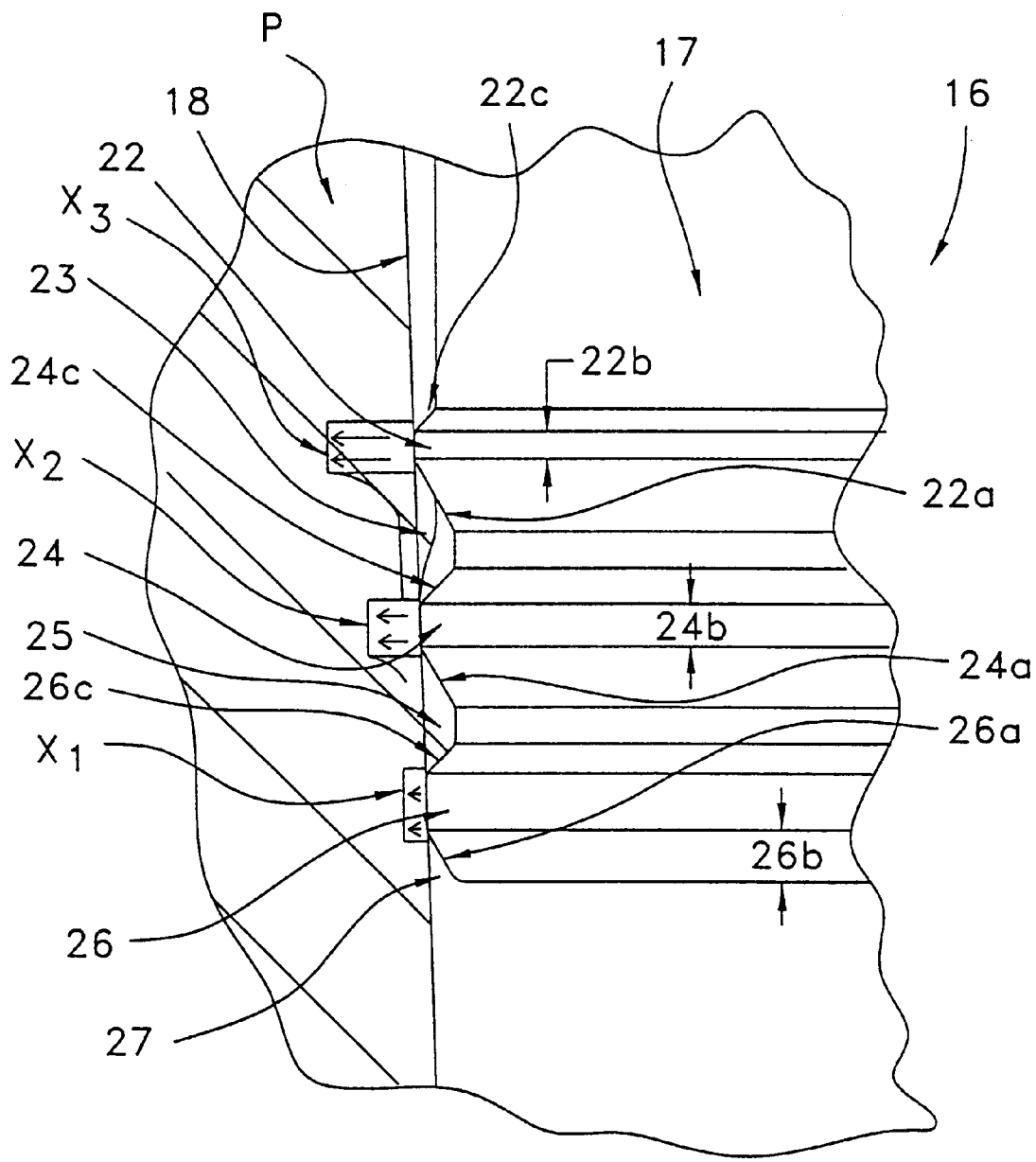
FIG. 3 is an enlarged, fragmentary view of the sealing formation of the plug sealing portion engaging the wall of the pipe hole shown in FIG. 2, and illustrating the anticipated radial pre-stress distribution.

Referring particularly to the embodiment illustrated in FIGS. 1–3, a pipe plug constructed in accordance with the present invention is generally indicated by reference character 10. The plug 10 has a tapered shank 12 which includes a tapered, thread-forming portion 14 from which a (progressively) tapered and unthreaded sealing end portion 16 extends. Between the thread-forming portion 14 and the driving head 11, there is provided a standard NPTF tapered thread formation 15. The thread-forming portion 14 may be of any known type of thread-forming configuration, such as a tri-lobular design. One such thread-forming design is well-known in the trade under the trademark TAPTITE®. Any type of thread-forming configuration for section 14 will be acceptable, and the tri-lobular TAPTITE® configuration is disclosed herein only by way of example, and not as a necessary element of the invention. In the embodiment illustrated in FIGS. 1–3, the threaded portions 14 and 15 conform to ⅛-27 standard NPTF pipe plug tap dimensions with a taper, for example of 1.7899°. The thread-forming portion 14 will cold-form internal threads to the NPTF mating standard in a smooth-reamed, tapered wall 18 of a pipe or workpiece P bore or hole 20. As shown in FIG. 1, the sealing end portion 16 of the plug 10 is initially insertable without engagement against the unthreaded opening mouth 19.

Since the NPTF standards are well known to those skilled in the art, the threads 14, 15 and 30 have not been shown to scale. It is to be understood that the thread-forming section 14 and full threads 15 are formed to a standard. The thread-forming portion 14 is designed to form an internal thread 30 in the tapered wall 18 of the pipe bore 20. The internal thread 30 thus formed is configured in accordance with the NPTF standard to be engaged by the threads 15, also formed to said selected NPTF standard. When the selected NPTF threads 15 and 30 are engaged, there will be produced metal-to-metal, interfering engagement between the respective crests and roots of threads 15 and 30 in accordance with said standard. This engagement results in a metal-to-metal seal along the spiral thread path. As such, it is to be understood that the threads 14, 15 and 30, as well as those thread configurations on the embodiment of FIGS. 4–10, are configured to NPTF standards, and are thus shown schematically.

As can be seen in FIG. 1, the sealing end portion 16 is spaced from the thread-forming portion 14 by a reduced diameter medial portion 17. In the embodiment of FIG. 1, the sealing end portion 16 includes three adjacently spaced sealing rings 22, 24 and 26 which have progressively reduced diameter to form a tapered relationship therebetween as best illustrated in the enlarged view of FIG. 3 (more fully described hereinafter).

Since the sealing rings 22, 24, 26 have sufficiently smaller diameter than the initial, decreasing bore diameter along the tapered pipe opening 19, there is no initial engagement therebetveen as the thread-forming portion 14 begins to cold-form or swage the female thread turns 30 (FIG. 2) into the smoothly reamed tapered pipe wall 18, 19, so that the sealing rings 22, 24, 26 do not initially engage said tapered wall and add drive load to the preliminary female thread-forming operation. However, as the thread-forming operation proceeds to the point where the drive head 11 approaches seating against the periphery of the pipe or workpiece opening mouth 19a, the sealing tip rings 22, 24 and 26 progressively are driven into interference engagement against the tapered bore wall 18 of the pipe. Each ring progressively swages a respective annular sealing deformation 23, 25 and 27 radially inwardly from the wall 18 against the angled lead face 22a, 24a and 26a of the respective sealing rings 22, 24 and 26 as shown in FIG. 3. The resulting annularly formed pipe wall deformation rings 23, 25 and 27 provide three additional pressure seal formations which will completely seal the bore 18. Further, these deformations 23, 25 and 27 and the seals attained therewith, extend about the full inner circumference of the pipe or workpiece wall 18, that is about a full 360°. The seal provided by the end portion 16 should provide a complete sealing of the bore 20. The engagement of the end portion 16 with the tapered wall 18 serves to pre-stress the workpiece or pipe wall with the pre-stressing patterns being illustrated schematically at $X_1$, $X_2$ and $X_3$ in FIG. 3. Further, the engagement of the NPTF threads 15 with the female NPTF threads 30 formed by the thread-forming portion 14, will provide a standard NPTF type seal along the spiral leak path provided by the engaged threads. This seal along with that provided by the sealing end portion 16 assures that the plug will not leak.

Further, keeping in mind the above discussion regarding the method of fabrication with regard to the prior art NPTF design, the above disclosed invention is possessed of numerous advantages. First the tapping step for the internally tapered bore is eliminated, as the self-tapping portion 14 on the plug will form the tapered internal thread 30 in the workpiece. Secondly, as the female or internal NPTF thread 30 is formed as the plug is engaged with the workpiece, there is no danger of cross-threading. Accordingly, the reworking and waste associated with the prior art method of fabrication is eliminated. Also, it should be noted that the engagement of the sealing end portion 16 with the wall 18 of the workpiece bore 19 serves to pre-stress the workpiece, as illustrated at $X_1$–$X_3$ to permit said pipe or workpiece P to better withstand internal pressures and also prevent leakage.

Referring again to FIG. 2, since the female thread turns 30 have a cold-formed or swaged minor diameter which is smaller than the diameter of the original smooth wall from which the mating threads were created, the smallest formed female mating diameter 31 formed is nevertheless larger than the outer diameter of the largest seal ring 22. The three seal rings 22, 24 and 26 can then be withdrawn with clearance past the smallest minor diameter 31 of the formed female threads 30 which will, therefore, not be disturbed or deformed when the plug 10 is entirely unthreaded and removed from the pipe or workpiece. Accordingly, the female threads 30 remain intact so that the plug 10 or any replacement NPTF pipe plug having standard NPTF threads can be threaded into the female threads 30 for re-sealing the pipe. That is to say, engagement of a standard NPTF plug will attain thread deformation and the expected NPTF type seal, which is not as efficient as the dual seal attained with the present invention.

Referring again to FIG. 3, in the illustrated embodiment of the plug 10, the end portion sealing rings 22,24 and 26 are disposed in a tapered relationship matching the taper of the originally smooth pipe side wall 18, for example, approximately 1.7899° relative to the pipe axis (not shown). The respective rings 22, 24 and 26 are separated by lesser diameter land portions that cooperate with the rings to define a series of spaced grooves. In order to roll form these annular sealing rings 22,24,26 simultaneously in a single operation with the formation of threads 14 and 15, the volume of the material in the rings should preferably be equal to each other. In order to achieve such equal ring volume, and produce the tapered relationship of the rings with relatively converging outer diameters, the longitudinal widths of the rings increase inversely relative to the converging decrease in outer diameters so that the sealing ring 26 has the smallest outer diameter with the largest longitudinally flat width 26b. The leading faces 22a,24a and 26a of the respective rings, preferably form an angle of approximately 45° relative to the respective face width 22b,24b and 26b in order to help minimize the resistance between these front faces as the seal rings 22,24,26 embed and swage the pipe wall 18 to form the annular internal wall deformation rings 23,25 and 27. The respective annular trailing faces 22c,24c and 26c can form angles of approximately 30° relative to the respective ring widths 22b,24b and 26b as shown in FIG. 3. As such, referring to the pre-stress patterns $X_1$–$X_3$, the forward most area of pre-stressing $X_1$ is the widest with the area $X_3$ the narrowest. The degree of pre-stressing is greater in area $X_3$ than at area $X_1$ due to the fact that the extent of radial interference is greater at area $X_3$ than area $X_1$ and the force is concentrated over a smaller area at $X_3$.

Figure 4:
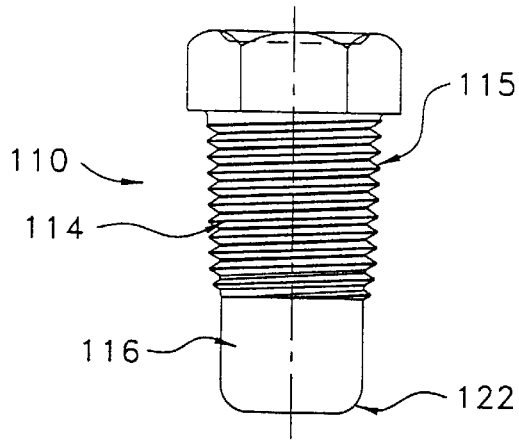
Figure 4A:
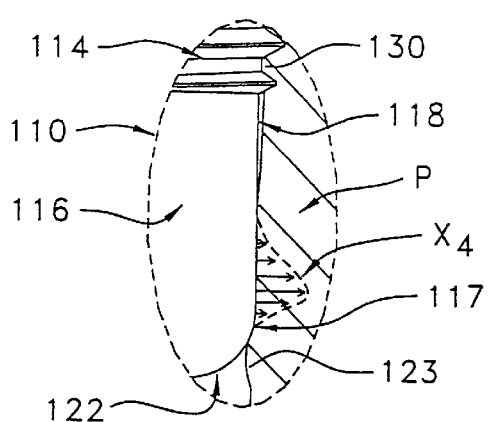

Referring now to FIGS. 4 and 4a, a second embodiment of a pipe plug construction in accordance with the present invention is generally indicated by reference character 110. In this embodiment of the pipe plug, the unthreaded sealing end portion 116 is a smooth cylindrical shank portion of reduced diameter extending without taper from the tapered, thread-forming portion 114. The threaded portion 115, similar to the threads 15 of the embodiment of FIGS. 1–3, is a standard NPTF thread. The operation of sections 114 and 115 correspond to those of sections 14 and 15 of the FIGS. 1–3 embodiment and as such these functions are not discussed in detail. The end of the sealing tip 118 has a rounded rim 122 in order to minimize initial interference with the taper bore wall 118 (FIG. 4a) as the thread-forming portion 114 begins cold-forming the female thread turns 130 (FIG. 4a) into the pipe wall 118. As shown in FIG. 4a, the annular lead side wall portion 117 of the cylindrical sealing tip portion 116 will be interference engagement with wall 118 and will cold-form or swage an annular, 360°; sealing deformation 123 radially inwardly from the tapered bore wall 118 to produce a leading pressure seal formation as the thread-forming portion 114 completes cold-forming the female thread turns 130 and the NPTF threads 115 engage the internal NPTF threads 130 formed by thread-forming portion 114. The sealing deformation 123 provides assured sealing of the sealing end 116 against the tapered pipe wall 118 to prevent leakage upstream of the spiral leak path through the thread turns 130 formed in the pipe bore wall 118. The pre-stressing pattern of the bore wall 118 attained with this embodiment is illustrated at $X_4$, FIG. 4a.

Figure 5:
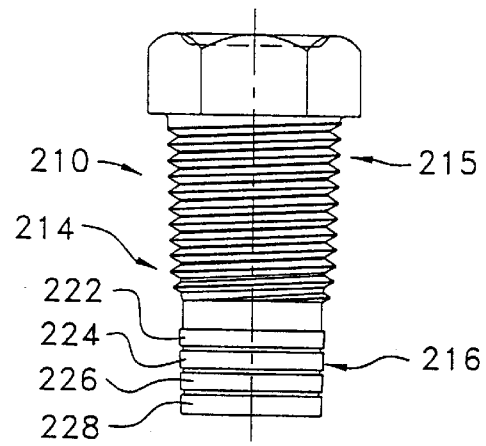
Figure 5A:
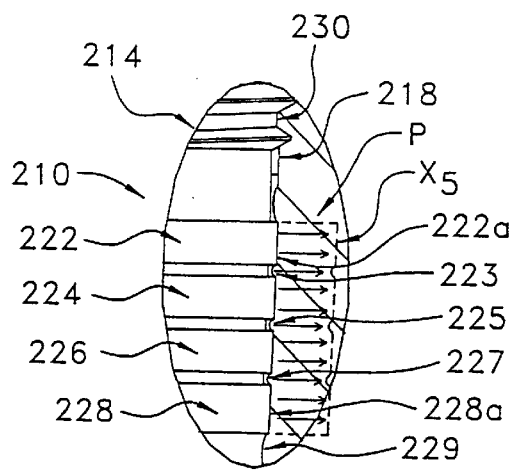

Referring now to FIGS. 5 and 5a, a third embodiment 210 of the pipe plug in accordance with the present invention is shown in which the sealing end portion 216 includes four spaced sealing rings 222,224,226 and 228. The sealing rings form a tapered relationship so that the sealing ring 228 has the smallest peripheral diameter 228a and the ring 222 has the largest peripheral diameter 222a. The sealing rings 222,224,226 and 228 perform swaging deformation of the pipe bore wall 218 to form annular, 360° pipe wall deformation rings 223,225,227 and 229 which add additional pressure seal augmenting the seal formation of the formed female pipe wall threads 230 against the thread-forming portion 214 of the plug, without however the fabrication complexity of the angled leading and trailing faces provided on the sealing rings 22,24 and 26 of the first pipe plug embodiment 10 shown in FIGS. 1–3. The prestressing pattern attained with the end portion 216 is shown at $X_5$.

Figure 6:
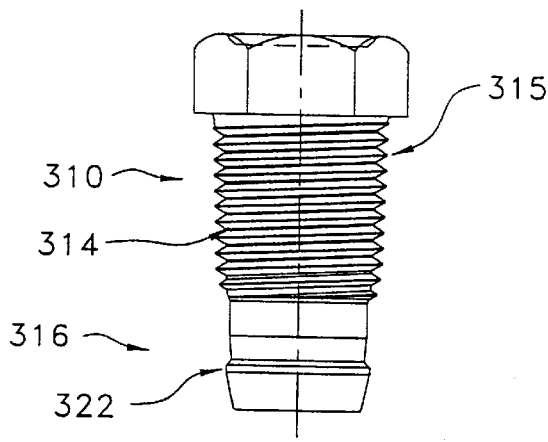
Figure 6A:
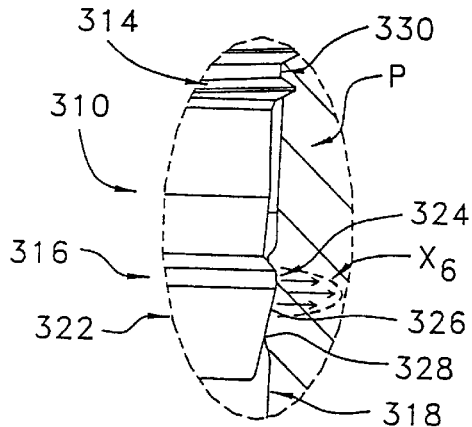

The embodiments of FIGS. 5 and 5a, as well as those of FIGS. 6–9 and 6a–9a, are similar to those of FIGS. 1–3 and 4 and 4a with respect to the general fastener design in that all include a driving end portion in the form of a driving head and a threaded shank. The threaded shank is divided in two portions 214 and 215 (FIGS. 6 and 6a). Similar to portions 14 and 15 of FIGS. 1–3. The thread-forming portions 214; 314 etc. are of the general type and kind disclosed with respect to portion 14, FIGS. 1–3, that is of a tri-lobular configuration. Here again, the type of thread-forming configuration used with respect to these embodiments is not critical to the invention. As an alternate to the tri-roundular or tri-lobular configuration discussed for any of the disclosed embodiments, the thread-forming sections 14; 114; 214 etc. could be of five (5) lobe design, or any other thread-forming configuration, many others of which are well known in the art. All that is required is that the thread-forming portions 14; 114; 214, etc., be capable of forming a standard NPTF internal thread 30; 130; 230 in wall 119; 119 etc. Correspondingly, the thread portion 15; 115; 215, etc., are of a standard NPTF configuration designed to mate with the internal NPTF threads formed by the thread-forming portions 14; 114; 214, etc. Accordingly, with regard to the discussion that follows regarding the remaining embodiments of FIGS. 6–9, while the respective thread portions 314; 414, etc.; 315; 415, etc. and 330; 430 are designated, they will not be discussed in detail and it is to be understood that these threaded portions correspond and function as do sections 14, 15 and 30, FIGS. 1–3. Only the novel configuration of the respective sealing end portions 316; 416, etc. will be discussed in detail.

With the above in mind, reference is now directed to FIGS. 6 and 6a, wherein a fourth embodiment of a pipe plug, designated 310, in accordance with the present invention includes a sealing end portion 316 having a single sealing ring 322. The sealing ring 322 has a generally narrow uniform cylindrical peripheral surface 324 as best shown in FIG. 6a. The peripheral surface 324 has a conically tapered leading face 326 against which the ring 322 swages an annular, 360°, a sealing deformation ring 328 radially inwardly from the taper pipe wall 318. The longitudinal taper of the conical lead face 326 promotes an extended surface for engagement of the extended bore wall deformation 328 for assured seal by the sealing tip 316 and prevention of any spiral leak through the cold-formed female pipe thread turns 330 by the plug thread-forming portion 314. The pre-stress pattern is illustrated at $X_6$, FIG. 6a. As can be seen, the prestressing is greatest proximate the land or cylindrical surface 324, and tapers off toward the end of the sealing portion 316. Here again, the seal provided by the interfering engagement of sealing portion 316 with bore 318 and the deformation thereof at 328 provides a pressure seal that enhances the overall sealing action and works in tandem with the seal provided by the engagement of standard NPTF threads 315 and 330.

Figure 7:
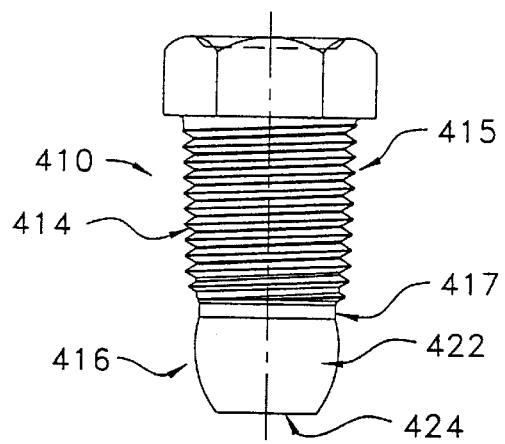
Figure 7A:
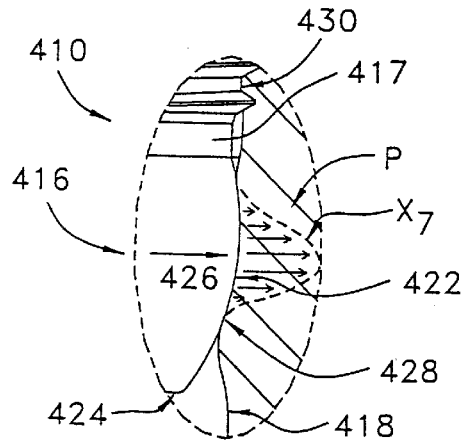

Referring now to FIGS. 7 and 7a, a fifth embodiment 410 of a pipe plug in accordance with the present invention has a sealing end portion 416 which has a generally bulbous or otherwise curved peripheral surface 422 formed in truncate extension from a reduced shank portion 417 at one end and a truncate end surface 424 at the terminal end of the plug. The peripheral surface 422 may be generally spherical, or elliptical, or merely generated from any curved surface. The arcuate sealing surface 422 cold-forms the wall 418 to produce a swaged or sheared annular, 360°, sealing deformation 428. The maximum diameter 426 of the arcuate sealing tip surface 422 is smaller than the minor diameter of the smallest female thread turn cold-formed by the thread-forming plug portion 414 to enable withdraw clearance of the sealing tip portion 416 through the formed female thread turns 430 to enable plug removal without disturbance of the formed female pipe threading turns. The pre-stressing pattern of wall 418 is illustrated at $X_7$.

Figure 8:
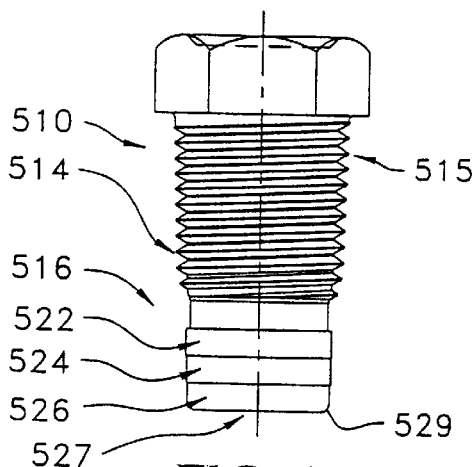
Figure 8A:
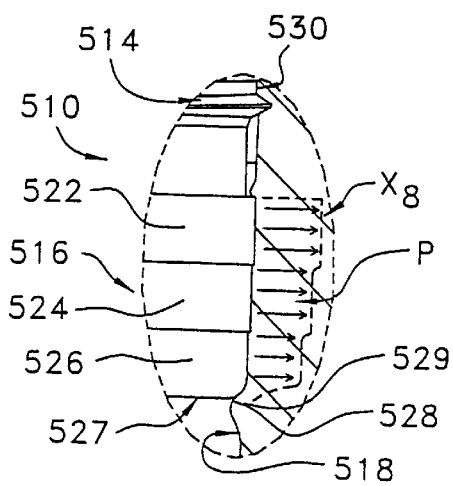

In FIGS. 8 and 8a, a sixth embodiment 510 of a pipe plug in accordance with the present invention is illustrated as having a sealing end portion 516 including three cylindrically formed sealing rings 522,524 and 526. The sealing rings 522,524 and 526 are serially contiguous or stepped with progressively reduced respective diameters to form an incrementally tapered relationship therebetween converging toward the planar terminal end 527 of the fastener. This end 527 has a rounded end rim 529 against which a swaged annular wall deformation from the tapered pipe bore wall 518 provides the pressure seal at the plug sealing tip portion 516. The sealing rings 522, 524, 526 produce progressively increasing interference and deformation of the bore wall 518. Thus, the pre-stressed pattern as illustrated at $X_8$ is attained. The seal achieved with the end portions 516 work with the standard NPTF seal achieved with the engagement of threads 515 and 530 to assure that the plug does not leak.

Figure 9:
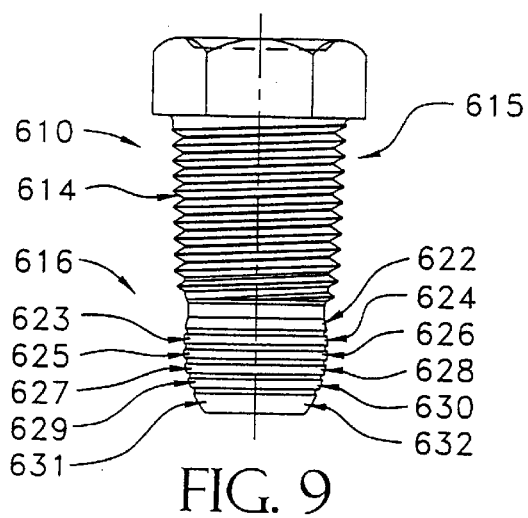
Figure 9A:
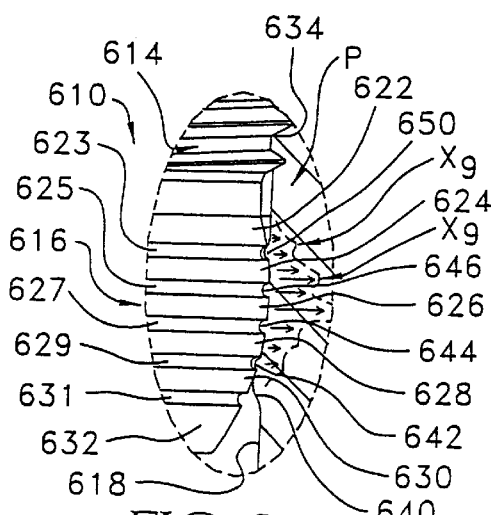

In FIGS. 9 and 9a a seventh embodiment is shown. This seventh embodiment 610 of a pipe plug in accordance with the present invention has a sealing tip portion 616 in which an annular, arcuate side wall surface is portioned into six annular rings 622,624,626,628,630 and 632 which are narrowly spaced by respective annular recesses or grooves 623,625,627,629 and 631. The spacing grooves provide generally sharp lead edges on the respective sealing rings which bite into the tapered bore wall 618 to form a series of annular sealing deformations 640,642,644,646 and 650 and a plurality of additional pressure seal formations which completely eliminate any potential spiral leak path between female thread turns 630 formed into the pipe bore and the thread-forming portion 614 of the pipe plug 610. The pre-stressing pattern achieved with end portion 616 is shown at $X_9$.

Figures 10, 10A:
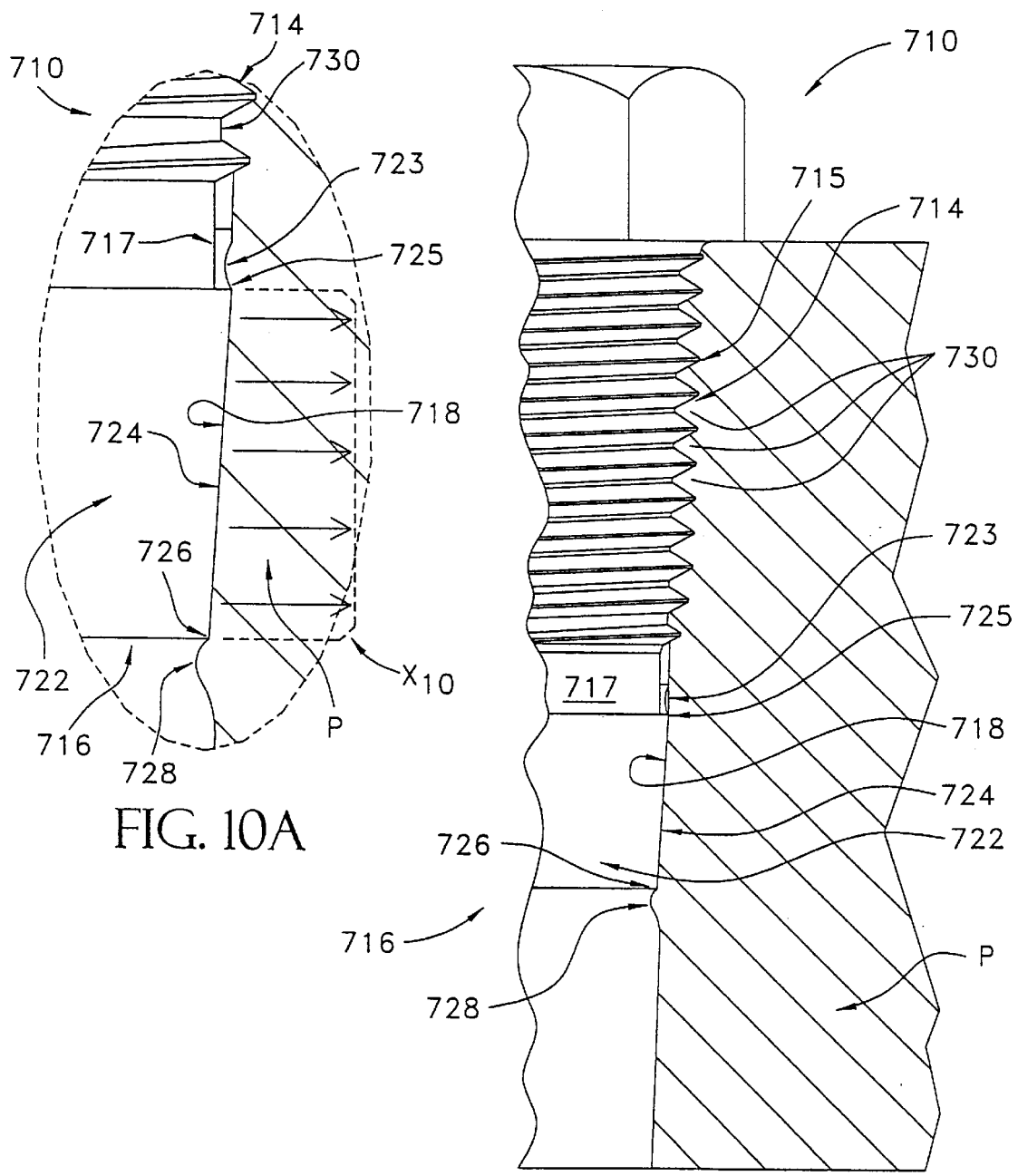

Referring now to FIGS. 10 and 10a, an eighth embodiment 710 for a pipe plug in accordance with the present invention has a sealing end portion 716 having a single, elongate sealing ring 722. The sealing ring 722 has a generally elongate, conically tapered peripheral surface 724 and a generally sharp-edged, annular leading rim 726 which bites into the tapered bore wall 718 to shear or swage an annular sealing ring deformation 728 radially inwardly from the wall 718. The sealing deformation 728 forms an additional pressure seal against the rim 726 and the elongate conical wall 724 provides extended seal surface against tapered wall 718 which combine to completely eliminate any potential spiral leak path between the female thread turns 730 formed into the tapered pipe wall 718 in the thread-forming portion 714 of the plug 710. A backwardly sheared, annular sealing deformation 723 is also formed at the rear, sharpened-edge annular rim 725 of the conical sealing tip wall 724. Radial clearance for the rear seal deformation 723 is provided by the reduced diameter medial shank portion 717 of the plug 710. Here again the pre-stress pattern has been illustrated schematically, and is indicated at $X_{10}$.

While the sealing end portion 16; 116 . . . 716, have been illustrated in conjunction with a self-threading or tapping plug 10, several alternatives should be kept in mind. First, the plug or plugs 10, 110 . . . 710 may be employed without the sealing end portion 16; 116 . . . 716, as it is believed that the self-threading construction of the thread portion 14 and 15 (114; 115 . . . 714,715) are novel per se and thus patentable. Further, the sealing end portion 16; 116 . . . 716 are not limited to use on the self-threading plug 10; 110 . . . 710 of the present invention, but may be used on standard NPTF plugs that are not self-tapping and are engaged in pre-tapped pipe on workpiece apertures.

While preferred embodiments of the present invention are shown and described, it is envisioned that those skilled in the art may devise various modifications and equivalents without departing from the spirit and scope of the appended claims.

As for example, the configuration of the sealing end portion 16; 116; 216 etc. may take varying shape. The primary considerations are that the sealing end portion achieve interfering engagement with the bore wall to such an extent as to attain a seal. While deformation and cold-forming of the bore wall is preferred, it is not absolutely necessary to achieve a seal, however, deformation tends to insure sufficient interference to achieve a seal. Further, while the thread-forming portions 14; 114; 214 etc., are disclosed to be formed as tri-lobular or tri-roundular in accordance with the well known TAPTITE® type of thread-forming design, other thread-forming configurations for threads 14; 114 etc., may be employed, these are also well-known in the art. The only requirement is that the thread-forming portions 14; 114 etc., produce the desired internal thread in accordance with the NPTF standards. Further, as discussed above, the plug 10; 110 . . . 710 may be used without a forward sealing portion 16; 116 . . . 716, or the forward sealing portion designs may be used on standard NPTF plugs.

The invention claimed is:

1. A plug and fastener for sealing in an opening formed in a workpiece, said plug and fastener comprising: a shank having a threaded portion for engaging with an internal wall of said opening and providing a first seal, and having a non-helical sealing portion generally proximate said threaded portion which enters said opening, said sealing portion being configured to engage and provide a second seal against the internal wall of said opening, said sealing portion comprising a plurality of non-helical sealing rings.

2. A plug and fastener according to claim 1, wherein said sealing portion is diametrically dimensioned smaller than the smallest minor diameter of said threaded portion in order to ensure that said sealing portion can be withdrawn through said opening without disturbance of said internal wall by the withdrawal of said sealing portion, so that said internal wall remains intact to allow re-engagement of said plug and fastener therewith.

3. A plug and fastener according to claim 1, wherein said sealing rings have respective outer diameters differentially dimensioned in relationship and converging toward an end portion of said shank.

4. A plug and fastener according to claim 3, wherein each of said sealing rings has a longitudinally extending and radially uniform peripheral surface defining said differential diameters.

5. A plug and fastener according to claim 4, wherein each of said sealing rings further includes a longitudinally leading face extending angularly from said respective radially uniform peripheral surface.

6. A plug and fastener according to claim 1, said sealing portion comprising at least three sealing rings.

7. A plug and fastener according to claim 1, wherein said sealing portion comprises a plurality of sealing rings having outer diameters differentially dimensioned in relationship and converging toward an end portion of said shank.

8. A joint structure comprising in combination a workpiece having an opening, a plug and fastener for sealing in said opening formed in said workpiece, said plug and fastener comprising: a shank having a threaded portion engaging with an internal wall of said opening and providing a first seal, and having a sealing portion generally proximate said threaded portion which enters said opening, said sealing portion being configured to engage and provide a second seal against the internal wall of said opening, said sealing portion comprising a plurality of non-helical sealing rings.

9. A method of providing a seal between a plug and fastener and a workpiece having an opening formed therein: said method comprising the steps of: providing said plug and fastener, said plug and fastener having a shank, a driving portion on said shank, a threaded portion formed along the shank for engaging with an internal wall of said opening and providing a first seal, and a sealing portion generally proximate said threaded portion which enters said opening, said sealing portion being configured to engage and provide a second seal against the internal wall of said opening, said sealing portion comprising a plurality of non-helical sealing rings; providing a workpiece having an opening; engaging said plug and fastener in said opening and driving said plug and fastener into said opening such that said sealing portion enters said opening and said threaded portion engages said internal wall to provide a first seal; and continuing to drive said plug and fastener into said opening so that said sealing portion engages said internal wall and provides a second seal.

10. A method according to claim 9, wherein said sealing portion is diametrically dimensioned smaller than the smallest minor diameter of said threaded portion, wherein said method further comprises withdrawing said sealing portion through the internal wall in said opening without disturbing said internal wall so that said internal wall remains intact to allow re-engagement of said plug and fastener therewith.

11. A method according to claim 9, wherein said sealing rings have respective outer diameters differentially dimensioned in relationship and converging toward an end portion of said shank.

12. A method according to claim 11, wherein each of said sealing rings has a longitudinally extending and radially uniform peripheral surface defining said differential diameters.

13. A method according to claim 12, wherein each of said sealing rings further includes a longitudinally leading face extending angularly from said respective radially uniform peripheral surface.

14. A method according to claim 9, said sealing portion comprising at least three sealing rings.

15. A joint structure comprising in combination a workpiece having an internally threaded tapered opening with the threads formed to a predetermined, standard configuration, a plug and fastener engaged in said tapered opening formed in said workpiece, said fastener comprising: a shank having a driving portion thereon and a threaded portion including an external threaded portion formed to a predetermined, standard configuration to engage with said internal threads in interfering sealed engagement, and a sealing portion generally proximate said first externally threaded portion toward an end portion of said shank which initially enters said tapered workpiece opening, said sealing portion having a configuration arranged to engage and seal against the wall of said workpiece tapered opening in order to supplement the seal attained by said thread engagement of said threaded portion with the internal thread formed in said tapered workpiece opening, said sealing portion comprising a plurality of non-helical sealing rings.

16. A plug and fastener for sealing in an opening formed in a workpiece, said plug and fastener comprising: a shank having a threaded portion for engaging with an internal wall of said opening and providing a first seal, and having a sealing portion generally proximate said threaded portion which enters said opening, said sealing portion being configured to engage and provide a second seal against the internal wall of said opening, wherein said sealing portion comprises a plurality of longitudinally spaced annular sealing rings arranged for respective sealing engagement of said internal wall of said opening, wherein said sealing rings have respective outer diameters differentially dimensioned in relationship and converging toward an end portion of said shank, wherein each of said sealing rings has a longitudinally extending and radially uniform peripheral surface defining said differential diameters, wherein each of said sealing rings further includes a longitudinally leading face extending angularly from said respective radially uniform peripheral surface.

17. A plug and fastener for sealing in an opening formed in a workpiece, said plug and fastener comprising: a shank having a threaded portion for engaging with an internal wall of said opening and providing a first seal, and having a sealing portion generally proximate said threaded portion which enters said opening, said sealing portion being configured to engage and provide a second seal against the internal wall of said opening, wherein said sealing portion comprises a plurality of longitudinally spaced annular sealing rings arranged for respective sealing engagement of said internal wall of said opening, wherein each of said sealing rings includes a longitudinally leading face extending angularly from a respective radially uniform peripheral surface.

18. A plug and fastener for sealing in an opening formed in a workpiece, said plug and fastener comprising: a shank having a threaded portion for engaging with an internal wall of said opening and providing a first seal, and having a sealing portion generally proximate said threaded portion which enters said opening, said sealing portion being configured to engage and provide a second seal against the internal wall of said opening, wherein said sealing portion comprises a bulbous curved peripheral surface, wherein said curved peripheral surface forms a truncated extension from a reduced shank portion.

19. A method of providing a seal between a plug and fastener and a workpiece having an opening formed therein: said method comprising the steps of: providing said plug and fastener, said plug and fastener having a shank, a driving portion on said shank, a threaded portion formed along the shank for engaging with an internal wall of said opening and providing a first seal, and a sealing portion generally proximate said threaded portion which enters said opening, said sealing portion being configured to engage and provide a second seal against the internal wall of said opening; providing a workpiece having an opening; engaging said plug and fastener in said opening and driving said plug and fastener into said opening such that said sealing portion enters said opening and said threaded portion engages said internal wall to provide a first seal; and continuing to drive said plug and fastener into said opening so that said sealing portion engages said internal wall and provides a second seal, wherein said sealing portion comprises a plurality of longitudinally spaced annular sealing rings arranged for respective sealing engagement of said internal wall of said opening, wherein said sealing rings have respective outer diameters differentially dimensioned in relationship and converging toward an end portion of said shank, wherein each of said sealing rings has a longitudinally extending and radially uniform peripheral surface defining said differential diameters, wherein each of said sealing rings further includes a longitudinally leading face extending angularly from said respective radially uniform peripheral surface.

20. A method of providing a seal between a plug and fastener and a workpiece having an opening formed therein:

said method comprising the steps of: providing said plug and fastener, said plug and fastener having a shank, a driving portion on said shank, a threaded portion formed along the shank for engaging with an internal wall of said opening and providing a first seal, and a sealing portion generally proximate said threaded portion which enters said opening, said sealing portion being configured to engage and provide a second seal against the internal wall of said opening; providing a workpiece having an opening; engaging said plug and fastener in said opening and driving said plug and fastener into said opening such that said sealing portion enters said opening and said threaded portion engages said internal wall to provide a first seal and said sealing portion engages said internal wall and provides a second seal, wherein said sealing portion comprises a plurality of longitudinally spaced annular sealing rings arranged for respective sealing engagement of said internal wall of said opening, wherein each of said sealing rings includes a longitudinally leading face extending angularly from a respective radially uniform peripheral surface.

21. A method of providing a seal between a plug and fastener and a workpiece having an opening formed therein:

said method comprising the steps of: providing said plug and fastener, said plug and fastener having a shank, a driving portion on said shank, a threaded portion formed along the shank for engaging with an internal wall of said opening and providing a first seal, and a sealing portion generally proximate said threaded portion which enters said opening, said sealing portion being configured to engage and provide a second seal against the internal wall of said opening; providing a workpiece having an opening; engaging said plug and fastener in said opening and driving said plug and fastener into said opening such that said sealing portion enters said opening and said threaded portion engages said internal wall to provide a first seal; and continuing to drive said plug and fastener into said opening so that said sealing portion engages said internal wall and provides a second seal, wherein said sealing portion comprises a bulbous curved peripheral surface, wherein said curved peripheral surface forms a truncated extension from a reduced shank portion.

22. A method of providing a seal between a plug and fastener and a workpiece having an opening formed therein:

said method comprising the steps of: providing said plug and fastener, said plug and fastener having a shank, a driving portion on said shank, a threaded portion formed along the shank for engaging with an internal wall of said opening and providing a first seal, and a sealing portion generally proximate said threaded portion which enters said opening, said sealing portion being configured to engage and provide a second seal against the internal wall of said opening; providing a workpiece having an opening; engaging said plug and fastener in said opening and driving said plug and fastener into said opening such that said sealing portion enters said opening and said threaded portion engages said internal wall to provide a first seal and said sealing portion engages said internal wall and provides a second seal, wherein said sealing portion comprises a bulbous curved peripheral surface, wherein said curved peripheral surface forms a truncated extension from a reduced shank portion.

* * * * *